United States Patent Office 2,820,773
Patented Jan. 21, 1958

2,820,773

METHOD OF PREPARING RUBBER-AND-RESIN COMPOSITIONS

Clifford W. Childers, Totowa Boro, and Charles F. Fisk, Clifton, N. J., assignors to United States Rubber Company, New York, N. Y., a corporation of New Jersey No Drawing. Application August 1, 1955
Serial No. 525,811

2 Claims. (Cl. 260—45.5)

This invention relates to rubber-and-resin compositions comprising butadiene polymer synthetic rubbers and styrene-acrylonitrile synthetic resins that are non-blooming and have excellent room temperature physical properties and high impact strength at low temperatures, and to methods of making the same.

The products of the present invention are an improvement over the products prepared according to Example 1 of British Patent 649,166, which illustrates the series polymerization of a styrene and acrylonitrile monomer mixture on the particles of a synthetic rubber latex prepared by the emulsion polymerization of a mixture of 30 to 90 parts of butadiene and correspondingly 70 to 10 parts of styrene. The products prepared according to Example 1 of British Patent 649,166 show an undesirable blooming on standing and have low impact strength at low temperatures.

The products of the present invention are free from bloom and have greatly increased impact strength at low temperatures, showing an impact strength at −40° C. of over 1 foot-pound per inch of Izod notch (ASTM Test D 256–47T).

The compositions of the present invention comprise 20 to 75 parts of an emulsion polymerized synthetic rubber which is preferably a polybutadiene synthetic rubber, but which may be a copolymer of not less than 95% of polymerized butadiene and not more than 5% styrene copolymerized therewith, and correspondingly 80 to 25 parts of a synthetic resin emulsion polymerizate of a mixture of 25% to 90% of styrene and correspondingly 75% to 10% of acrylonitrile. At least about 25% of the styrene-acrylonitrile resin in the rubber-and-resin composition must have been produced by polymerizing the styrene and acrylonitrile monomers conjointly in admixture with a previously prepared latex of the synthetic rubber in order to graft polymerize an appreciable amount of the resin on the synthetic rubber particles. We have found that in order to obtain an appreciable amount of the styrene and acrylonitrile that is polymerized in the synthetic rubber latex in the form of resin graft polymerized on the rubber particles and not as separate resin particles, the amount of dispersing agent should be maintained at not more than 5 parts (generally from 1 to 5 parts) per 100 parts of the sum of the synthetic rubber particles and the growing polymerized styrene-acrylonitrile resin particles until at least one-half of the styrene and acrylonitrile monomer mixture to be polymerized in the synthetic rubber latex has been converted to polymer. The graft polymer portion of the rubber-and-resin composition of the present invention consists of synthetic rubber particles to which polymeric styrene-acrylonitrile resin chains are attached by primary chemical bonds, and such graft polymer portion is not soluble or extractable by organic solvents capable of dissolving binary styrene-acrylonitrile copolymer resins, such as acetone.

As above stated, at least 25% of the styrene-acrylonitrile resin in the final rubber-resin composition will be polymerized in the synthetic rubber latex. Up to 100% of the resin in the final composition may be so polymerized in the synthetic rubber latex. Where less than all the resin in the final rubber-resin composition is polymerized in the synthetic rubber latex, the remaining styrene-acrylonitrile resin may be mixed in latex form with the latex of the synthetic rubber on which a part of the resin has been graft polymerized, and the mixed latices coagulated. Also, where less than all the resin in the final rubber-resin composition is polymerized in the synthetic rubber latex, the remaining styrene-acrylonitrile resin in dry form recovered from the resin latex may be mixed on a mill or in an internal mixer with the dried rubber-and-resin product recovered from the latex of the synthetic rubber on which a part of the resin has been graft polymerized. The ratio of styrene to acrylonitrile in the emulsion for preparing the separate resins may be the same as or different from the ratio of styrene to acrylonitrile in the mixture which is polymerized in the synthetic rubber latex, provided that they are each within the above mentioned range of 25% to 90% styrene and correspondingly 75% to 10% of acrylonitrile.

Using synthetic rubber latices which are emulsion polymerizates of less than 95% of butadiene and more than 5% of styrene copolymerized therewith, e. g. conventional GR–S latices which are copolymers of about 75 to 80% butadiene and 25 to 20% of styrene, gives unsatisfactory low temperature impact strength as compared to the products of the present invention. Polymerizing the rubber-forming monomers in admixture with a previously prepared styrene-acrylonitrile synthetic resin latex gives products that in no way resemble the products of the present invention, in that they are far inferior in their room temperature physical properties, such as tensile strength.

The synthetic rubber latex may be prepared by polymerizing the rubber forming monomers in aqueous emulsion in the presence of conventional catalyst, emulsifying agent, etc., at conventional polymerizing temperatures from 0° C. to 100° C. The polymerization of styrene and acrylonitrile in aqueous emulsion in the presence of an emulsifying agent and a peroxidic catalyst at conventional temperatures, from 0° C. to 100° C., is well known. In polymerizing the styrene and acrylonitrile in admixture with the synthetic rubber latex, peroxidic catalyst is added, and the temperature may be from 0° C. to 100° C., and the styrene and acrylonitrile and catalyst may be added to the latex continuously, or incrementally, or all may be added at the beginning of the polymerization.

The following illustrates the invention, all parts and percentages referred to herein being by weight:

EXAMPLE I

A 58% solids latex of butadiene-1,3 homopolymer containing 3 parts of an alkali-metal soap per 100 parts of polybutadiene rubber was used as the starting synthetic rubber latex. It was prepared in known manner by polymerizing the butadiene emulsion at about 65° C. in the presence of a small amount of persulfate catalyst and initially in the presence of 1 part of soap per 100 parts of monomer, followed by the addition of 2 more parts of soap during the course of the polymerization. One hundred parts of the above poly-butadiene latex (containing 58 parts of polybutadiene rubber) was mixed with 250 parts of water, 0.4 part of potassium persulfate, 1.7 parts of mixed tertiary alkyl ($C_{12}$ to $C_{16}$) mercaptan, 73 parts of styrene and 42 parts of acrylonitrile. The batch was heated at 50° C. for 5 hours to about 98% conversion, after which about 1 part of antioxidant was added. The latex was coagulated with formic acid solution and the coagulum was dried at 50° C. after which it was milled for 10 minutes at about 320° F., and molded into a flat sheet for test samples. The excellent physical properties, including exceptionally high impact strength, of the test samples are shown in Table I below. The impact strength tests on various compositions determine the relative susceptibility of the materials to fracture by shock of the materials. The test used was the cantilever beam or Izod type test in which the specimen is held as a cantilever beam and is broken by a blow delivered at a fixed distance from the edge of the specimen clamp. The test requires a notched specimen. The notch produces a standard degree of stress concentration. (For further details see ASTM Standards on Plastics, ASTM Designation: D256–47T, "Impact Resistance of Plastics and Electrical Insulating Materials.")

*Table I*

Impact strength (Izod), ft.-lbs./inch notch:
+25° C. _____ 11.5
−20° C. _____ 8.4
−40° C. _____ 7.9
Tensile Strength, p. s. i. _____ 3,245
Elongation, percent _____ 23
Flexural modulus, p. s. i., 25° C. _____ 183,000
Rockwell hardness R scale _____ 65

EXAMPLE II

This example illustrates the incremental addition of monomers. One hundred parts of the 58% solids polybutadiene latex having an average particle diameter slightly over 0.1 micron used in Example I was mixed with 250 parts of water, 0.5 part of potassium persulfate, 0.35 part of tert. octyl mercaptan, 37.5 parts of styrene and 21.5 parts of acrylonitrile. The batch was agitated 2 hours at 60° C. and 90 percent conversion of monomers was obtained. There was then added 0.25 part more of the potassium persulfate, 0.35 part more of the tert. octyl mercaptan, and an additional 37.5 parts of styrene and 21.5 parts of acrylonitrile. An additional one hour of agitation at 60° F. resulted in 94 percent overall conversion of the monomers, at which time 0.6 part of antioxidant was added. The latex was coagulated with calcium chloride solution, the coagulum dried at 50° C., milled for 10 minutes at about 320° F., and molded into a flat sheet for test samples. The excellent physical properties and exceptionally high impact strengths of the test samples are shown in the following Table II.

*Table II*

Impact strength (Izod), ft.-lbs./inch notch:
+25° C. _____ 8.8
−20° C. _____ 5.9
−40° C. _____ 4.9
Tensile strength, p. s. i. _____ 3,860
Elongation, percent _____ 15
Flexural modulus, p. s. i., 25° C. _____ 229,000
Rockwell hardness, R scale _____ 82

EXAMPLE III

This example shows the importance of maintaniing the soap content at not more than 5 parts per 100 parts of polymer. The synthetic rubber latex used was the 58% polybutadiene latex containing 3 parts of soap per 100 parts of polybutadiene rubber used in Example I. One part A of the polybutadiene rubber latex was used as prepared. To other portions B, C, D and E, were added, respectively, 1.7, 3.5, 7 and 10 parts of soap (sodium stearate) per 100 parts of rubber of the latex, making the total soap content of portions B, C, D and E, 4.7, 6.5, 10 and 13 parts per 100 parts of rubber, respectively.

To an amount of each of the five portions of the polybutadiene latex containing 58 parts of polybutadiene rubber was mixed 250 parts of water, 0.4 part of potassium persulfate, 0.8 part of tert. octyl mercaptan, 70 parts of styrene and 48 parts of acrylonitrile. The mixtures were agitated at 90° C. for two hours, giving about 95% conversion of styrene and acrylonitrile to copolymer in the rubber latex. The latices were coagulated with calcium chloride solution, the coagula dried at 50° C., milled for 10 minutes at about 320° F., and molded into flat sheets for testing. The results of the tests on the various samples is shown in the following Table III.

*Table III*

| | Samples | | | | |
|---|---|---|---|---|---|
| | A | B | C | D | E |
| Impact strength (Izod), ft.-lbs./inch notch: | | | | | |
| +25° C. | 9.3 | 7.8 | 1.6 | 1.1 | 0.5 |
| −20° C. | 6.2 | 5.2 | 1.2 | 0.7 | 0.3 |
| −40° C. | 4.3 | 2.3 | 0.8 | 0.6 | 0.3 |
| Tensile strength, p. s. i. | 3,750 | 3,410 | 2,940 | 2,710 | 2,530 |
| Elongation, percent | 30 | 31 | 9 | 8 | 8 |
| Flexural modulus, p. s. i., 25° C. | 221,000 | 209,000 | 179,000 | 177,000 | 190,000 |
| Rockwell hardness, R Scale | 84 | 77 | 70 | 64 | 60 |

The above clearly shows that about 5 parts of soap per 100 parts of polymer gives unsatisfactory low temperature impact strength, i. e. less than 1 ft.-pound per inch of Izod notch.

EXAMPLE IV

This example illustrates mechanically mixing the product made by emulsion polymerizing the styrene-acrylonitrile resin in the rubber latex with a separately prepared styrene-acrylonitrile copolymer.

A styrene-acrylonitrile resin was polymerized in a rubber latex as follows: Eighty parts of the 58% polybutadiene latex used in Example I was mixed with 290 parts of water, 0.7 part of potassium persulfate, and 0.15 part of sodium hydroxide. The temperature was raised to 50° C. and 0.07 part of sodium bisulfite was added. There was added to the above mixture continuously over a period of six hours a solution of 0.2 part of sodium hydroxide and 2 parts of sodium rosin soap dissolved in water, and a mixture of 30 parts of styrene and 17.5 parts of acrylonitrile. After the soap solution and the styrene and acrylonitrile monomer mixture were added at the end of the six hour period, the batch was agitated at 50° C. for four hours additional until about 85% conversion of monomers was obtained. The total reaction time was ten hours and the product comprised 46 parts of resin to 54 parts of rubber. After adding 1 part of antioxidant, the resin-rubber latex was coagulated with calcium chloride solution and the coagulum dried.

A styrene-acrylonitrile resin was separately polymerized as follows: Seventy parts of styrene and 30 parts of acrylonitrile were mixed with 200 parts of water, 2 parts of an alkyl aryl sulfonate emulsifying agent which was an alkyl benzene sulfonate in which the alkyl radical contained 12 to 18 carbon atoms (Nacconal NRSF), 0.3 part of potassium persulfate, 0.01 part of sodium bisulfite, 0.35 part of mixed ($C_{12}$–$C_{16}$) tertiary mercaptan. The mixture was agitated for four hours at 50° C. giving 100% conversion. The resin latex was coagulated with calcium chloride solution, and the coagulum dried.

One hundred parts of the resin-and-rubber product and 67 parts of the separately prepared styrene-acrylonitrile resin and 1 part of calcium stearate were milled together at about 320° F. to a homogeneous blend, and molded into flat sheets for testing. The following Table IV gives the results of the tests showing the excellent low temperature impact strength of the products of the present invention:

Table IV

Impact strength (Izod), ft.-lbs./with notch:
+25° C. ------------------------------- 8.6
−20° C. ------------------------------- 4.7
−40° C. ------------------------------- 2.7
Tensile strength, p. s. i. -------------- 4500
Elongation, percent -------------------- 50
Flexural modulus, p. s. i., 25° C. ------ 199,000
Rockwell hardness, R scale ------------- 89

EXAMPLE V

In order to compare the products with the present invention as above with products made from a rubber copolymer of butadiene with larger amounts of styrene than the 5% maximum of the products of the present invention and with a larger amount of soap, triplicate runs were made following Example I of British Patent 649,166, as follows:

The aqueous emulsions containing 75 parts of butadiene-1,3, 25 parts of styrene, 180 parts of water, 0.46 part of dodecyl mercaptan, 15 parts of sodium stearate, and 0.6 part of potassium persulfate were heated for 16 hours at 50° C., giving conversions of 85%, 96% and 99%. The unreacted butadiene was vacuum stripped, and to each of the three rubber latices were added 420 parts of water, 163 parts of styrene, 70 parts of acrylonitrile, 0.24 part of dodecyl mercaptan, and 1.4 parts of potassium persulfate. The styrene and acrylonitrile were polymerized in the rubber latex for ten hours at 50° C. giving 100% conversions. The latices were coagulated with calcium chloride solution, the coagula dried, milled for 10 minutes at about 320° F., and molded into flat sheets for testing. The results of the individual tests on the three samples are shown in the following Table V:

Table V

| | | | |
|---|---|---|---|
| Impact strength (Izod), ft.-lbs./with notch: | | | |
| +25° C | 1 | 2.6 | 1.4 |
| −20° C | 0.2 | 0.6 | 0.4 |
| −40° C | 0.1 | 0.1 | 0.2 |
| Tensile strength, p. s. i. | 5,620 | 3,700 | 4,400 |
| Elongation, percent | 14 | 14 | 22 |
| Flexural modulus, p. s. i., 25° C | 285,000 | 237,000 | 226,000 |
| Rockwell hardness, R scale | 96 | 85 | 80 |

It may be seen from the above table that the low temperature impact strengths are unsatisfactorily low.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method of preparing a rubber-and-resin product having an impact strength at −40° C. of over 1 foot-pound per inch of Izod notch which comprises polymerizing in a latex of a synthetic rubber containing not less than 95% of polymerized butadiene-1,3 and not more than 5% of styrene copolymerized therewith, a mixture of styrene and acrylonitrile, the styrene content of said mixture being 25% to 90% of styrene and the acrylonitrile content being correspondingly 75% to 10%, maintaining the amount of dispersing agent in the latex at not more than 5 parts per 100 parts of synthetic rubber and polymerized styrene-acrylonitrile contained therein until at least one-half of the styrene and acrylonitrile monomer mixture to be polymerized in admixture with the synthetic rubber has been converted to polymer, the amount of said resin being polymerized in the rubber latex being in the range from one-third to four parts of resin per part of synthetic rubber, and separating the thus formed rubber-resin product from the aqueous medium, said dispersing agent being alkali-metal soap.

2. The method of preparing a rubber-and-resin product having an impact strength at −40° C. of over 1 foot-pound per inch of Izod notch which comprises polymerizing in a polybutadiene-1,3 homopolymer synthetic rubber latex, a mixture of styrene and acrylonitrile, the styrene content of said mixture being 25% to 50% of styrene and the acrylonitrile content being correspondingly 75% to 10%, maintaining the amount of dispersing agent in the latex at not more than 5 parts per 100 parts of synthetic rubber and polymerized styrene-acrylonitrile contained therein until at least one-half of the styrene and acrylonitrile monomer mixture to be polymerized in admixture with the synthetic rubber has been converted to polymer, the amount of said resin being polymerized in the rubber latex being in the range from one-third to four parts of resin per part of synthetic rubber, and separating the thus formed rubber resin product from the aqueous medium, said dispersing agent being alkali-metal soap.

References Cited in the file of this patent

UNITED STATES PATENTS 2,700,185   Lee ------------------- Jan. 25, 1955

FOREIGN PATENTS 649,166   Great Britain ----------- Jan. 17, 1951

UNITED STATES PATENT OFFICE

CERTIFICATE OF CORRECTION

Patent No. 2,820,773

January 21, 1958

Clifford W. Childers et al.

It is hereby certified that error appears in the printed specification of the above numbered patent requiring correction and that the said Letters Patent should read as corrected below.

Column 4, line 25, for "about" read -- above --.

Signed and sealed this 19th day of January 1960.

(SEAL)
Attest:

KARL H. AXLINE
Attesting Officer

ROBERT C. WATSON
Commissioner of Patents